(12) United States Patent
Green (10) Patent No.: US 7,419,075 B2
(45) Date of Patent: Sep. 2, 2008

(54) UTILITY RACK FOR PICKUP TRUCKS

(76) Inventor: Christopher Phillip Green, 3393 Diane Way, Madera, CA (US) 93637

( * ) Notice: Subject to any disclaimer, the term of this patent is extended or adjusted under 35 U.S.C. 154(b) by 0 days.

(21) Appl. No.: 10/610,259

(22) Filed: Jun. 30, 2003

(65) Prior Publication Data

US 2004/0262348 A1 Dec. 30, 2004

(51) Int. Cl.
  *B60R 7/00* (2006.01)
(52) U.S. Cl. .......................... 224/405; 224/484; 211/206
(58) Field of Classification Search ................. 224/405, 224/403, 402, 484, 404, 322, 321, 309; 248/127; 296/3; 211/206, 196, 191
See application file for complete search history.

(56) References Cited

U.S. PATENT DOCUMENTS

| 3,891,262 A | | 6/1975 | Brunel |
| D244,268 S | | 5/1977 | Hinch |
| 4,138,046 A | | 2/1979 | De Freze |
| 4,405,170 A | | 9/1983 | Raya |
| 4,509,787 A | | 4/1985 | Knaack et al. |
| 4,611,824 A | * | 9/1986 | McIntosh ..................... 280/748 |
| 4,659,131 A | | 4/1987 | Flournoy, Jr. |
| 4,676,543 A | | 6/1987 | Lewis |
| 5,002,324 A | | 3/1991 | Griffin |
| 5,190,337 A | | 3/1993 | McDaniel |
| 5,261,719 A | * | 11/1993 | Tucker .................. 296/100.18 |
| 5,553,762 A | * | 9/1996 | Brown ........................ 224/403 |
| 5,628,540 A | | 5/1997 | James |
| 5,692,791 A | | 12/1997 | Sulzer |
| 5,752,734 A | * | 5/1998 | Ward et al. ...................... 296/3 |
| 5,806,905 A | | 9/1998 | Moore |
| D410,429 S | * | 6/1999 | Derecktor .................. D12/406 |
| D436,915 S | | 1/2001 | Burger |
| D444,446 S | | 7/2001 | Carter |
| 6,340,106 B1 | | 1/2002 | Dutton |
| 6,347,731 B1 | * | 2/2002 | Burger ....................... 224/405 |
| D463,358 S | | 9/2002 | Thomas |
| 6,513,849 B2 | | 2/2003 | Carter |
| 6,557,917 B1 | | 5/2003 | Colcombe |

OTHER PUBLICATIONS

Product Showroom Weather Guard Truck Equipment, 2003, Internet, Knaack Manufacturing Company, US.
Assembly and Installation Instructions for Model 1234 Aluminum Truck Rack, Knaack Manufacturing Company, US.
Truck Racks, Hauler Racks, Internet, Hauler Racks, 2003, US.

* cited by examiner

*Primary Examiner*—Stephen K. Cronin
(74) *Attorney, Agent, or Firm*—Richard A. Ryan (57) ABSTRACT

A utility rack for pickup trucks with a pair of rack assemblies configured to carry cargo above a pickup truck bed. The rack is easily installed and removed without requiring drilling or other modifications to the pickup truck and is configured to carry heavy loads while utilizing relatively lighter weight materials. The rack assemblies have an elongated main body member with support assemblies at each end and a clamp assembly for securing the support assemblies to the truck bedrails. Each support assembly has two legs and a base member forming a triangular configuration with a receiver member disposed at the upper ends of the legs to connect to the main body member. The legs pivotally mount to the base member to allow the base member to correspond to the angle of the bedrails. One or both rack assemblies can be a sawhorse for use off of the pickup truck.

46 Claims, 5 Drawing Sheets

UTILITY RACK FOR PICKUP TRUCKS

BACKGROUND OF THE INVENTION

A. Field of the Invention

The field of the present invention relates generally to adjustable utility racks for pickup trucks and similar vehicles. More particularly, the present invention relates to such utility racks that removably mount to the top of the truck's bedrails without requiring drilling or other modifications to the truck, including the bedrails, and which are easily installed and removed. Even more particularly, the present invention relates to such utility racks that have a removable component that can be utilized on the ground as a sawhorse.

B. Background

As is generally known, many people utilize pickup trucks and similar vehicles for transporting work supplies, sporting equipment and other materials. Although pickup trucks generally have a rear cargo area that is suitable for carry a variety of materials, many people prefer to utilize a utility rack to carry some of these materials. The use of a utility rack provides additional carrying capacity for the pickup truck and frees up the rear cargo area to carry larger or heavier weight materials. With regard to certain elongated or oversized materials, the use of a rack assembly is a necessity to prevent these materials from substantially extending beyond the rear of the vehicle or from being carried in an unbalanced condition (i.e., long ladders, canoes, pipes, wood or steel members and the like). Most utility racks allow these longer materials to be carried in a manner that extends the materials over the cab portion of the pickup truck.

The prior art discloses a wide variety of utility racks suitable for use with pickup trucks and similar vehicles. The typical pickup truck configured utility rack comprises a number of interconnected frame members that form the frame portion of the rack. Some of the known racks utilize frame members that are fixedly connected to each other, such as by welding or riveting, while other racks have frame members that are connected with bolts, screws and other removable connectors. Most known utility racks mount to the pickup truck by mechanisms that require drilling, welding or other modifications to the horizontally displaced load bearing bed and/or the upstanding forward wall, sidewalls and rear tailgate portions of the rear cargo area. Other racks utilize various clamping mechanisms to clamp the frame to the pickup truck or utilize connectors that are configured to being received in one or more stake pockets that are commonly disposed on the sidewall bedrails (i.e., the generally shaped, upper most portion of the sidewalls). For the typical utility rack, at least a portion of the frame rests on and is supported by the pickup truck's bedrails. Unfortunately, because the uppermost edge of some bedrails are not horizontally configured, the utility rack frame ends up sitting at an undesirable angle that can create load bearing and material carrying problems for the rack user. To resist collapse and dislodging of the rack off the pickup truck due to shearing loads, the typical utility rack require heavier, weight frame members to provide the necessary support and carry the desired loads.

A number of prior art patents describe different configurations for pickup truck utility racks that are adaptable for carry various materials, including elongated or oversized materials, above the bed of a pickup truck. For instance, the prior art includes a number of utility racks that are bolted or otherwise attached to a pickup truck with one or more holes drilled in the pickup truck, as exemplified by U.S. Pat. No. 6,557,917 to Colcombe, U.S. Pat. No. 6,513,849 to Carter, U.S. Pat. No. D436,915 to Burger, U.S. Pat. No. 5,002,324 to Griffen and U.S. Pat. No. 4,676,543 to Lewis. The patents to Carter and Lewis also show that it is known to weld a part of the utility rack frame directly to the pickup truck. Each of these patents require modification to the pickup truck, a configuration many pickup truck owners find to be unacceptable. Other prior art pickup truck racks are configured to utilize one or more stake pockets, either to receive a frame member directly or with the use of stake pocket anchors, as exemplified by U.S. Pat. No. 6,347,731 to Burger, U.S. Pat. No. D444,446 to Carter, U.S. Pat. No. 5,806,905 to Moore, U.S. Pat. No. 5,692,791 to Sulzer, U.S. Pat. No. 5,190,337 to McDaniel, U.S. Pat. No. 4,659,131 to Plournoy, Jr., and U.S. Pat. No. 4,405,170 to Raya. Some of these patents, such as those to Sulzer and Raya, disclose the additional use of bolts, with holes drilled into the truck, and clamps to further secure the fame to the truck bedrail. Other patents disclose the utility racks that require at least one component to be mounted to the truck bed floor or sidewall, such as U.S. Pat. No. 4,509,787 to Knaack et al., U.S. Pat. No. 4,138,046 to De Freze and U.S. Pat. No. 3,891,262 to Brunel. A few patents, such as U.S. Pat. No. 6,340,106 to Dutton (FIG. 7) and U.S. Pat. No. 5,628,540 to James, disclose the use of clamping members to clamp a portion of the pickup truck frame to the bedrail of the pickup truck.

Although the prior art discloses a number of utility racks for use with pickup trucks and the like, there are certain characteristics of these racks that limit their complete acceptance. For instance, some of these utility racks are not adaptable to different sized rear cargo areas or, if adaptable, only adaptable in a very limited range of sizes. Those utility racks that fixedly mount to the pickup truck reduce the flexibility of the truck owner or user for utilizing the rear cargo area for certain uses, such as carrying a camper shell or certain sized materials. In addition, those utility racks that have frame members fixedly attached to each other are generally not easy to install on or remove from the pickup truck. Even some of the utility racks that are configured to be taken on and off the pickup truck when desired are not necessarily easy to handle or install and remove, generally due to the size and/or weight of the individual frame members. Those utility racks that rely on engagement with or other use of the stake pocket are limited to those pickup trucks that have such components and, when used, foreclose the ability of the pickup truck user to utilize the stake pocket for other purposes. No known utility racks have a component which can be removed from the pickup truck and directly utilized as a sawhorse. What is needed, therefore, is a pickup truck utility rack that is easily installed and removed from a pickup truck without requiring the use of holes drilled in or other modifications made to the truck, adaptable to a range of different sized rear cargo areas, adaptable to bedrails that are not horizontal (relative to the truck bed) and which has a frame configured to sufficient support the desired loads with relatively lighter weight components. In addition, it is desirable that the pickup truck rack include at least one removable component that can be easily removed from the pickup truck and utilized on the ground as a sawhorse.

SUMMARY OF THE INVENTION

The utility rack for pickup trucks of the present invention solves the problems and provides the benefits identified above. That is to say, the present invention discloses a utility rack particularly configured to be relatively easy to install and remove from the pickup truck, be adaptable to pickup truck beds of different widths and lengths, and not require any holes to be drilled in or other modifications made to the pickup truck. The utility rack of the present invention is particularly configured for installation on those pickup trucks that have bedrails which are not horizontal with the truck bed and for those trucks that do not have stake pockets in the bedrail or for users who do not want to use the stake pockets for the utility rack. In addition, one embodiment of the pickup truck utility rack of the present invention includes a component which can be easily removed from the pickup truck and utilized as a sawhorse.

In one aspect of the present invention, the pickup truck utility rack comprises a first rack assembly and a second rack assembly configured to mount to the bedrails of the opposing sidewalls on a pickup truck. Both rack assemblies have an elongated main body member, a first support assembly at a first end of the main body member, a second support assembly at a second end of the main body member and a clamp assembly at each support assembly to demountably secure rack assemblies to the pickup truck. The support assemblies are configured to transversely support the main body member above the bed. They each have two leg members, a connecting element, a base member and a receiver member, with the leg members and the base member configured in a generally triangle shape with the receiver member disposed between the leg members. The receiver member configured to connect to either the first end or the second end of the main body member. The leg members pivotally connect to the base member so that it is in a generally parallel planar relationship with the upper edge of the bedrail when the utility rack is mounted on the pickup truck. Preferably, the components of the utility rack are collapsible. The main body member can be made to be adjustable in length by utilizing telescoping members. The base member is tubular and the connecting element, such as a snap-button connector, is disposed therein and configured to cooperate with the base member to secure the leg members to the base member and allow rotation of the base member relative to the leg members. Hook members are used to clamp the rack assemblies to the bedrails.

In one configuration, the rack assemblies are utilized as racks only, with the support assemblies being inwardly inclining relative to the sidewalls and the receiver member being tubular to receive the ends of the main body member therein. The clamp assembly comprises a clamp tube having a hook at one end and a threaded shank at the other end, a nut tube configured to threadably engage the shank and a channel member attached to the base. In this configuration, the clamp tube is configured to draw the hook member against the bedrail when the nut tube engages the main body member or the receiver member and the channel member is configured to at least partially confine the clamp tube. The clamp tube is received through holes in the main body member and receiver so as to join these components together.

In another configuration, the rack assemblies are configured for use off the pickup truck as a sawhorse. In this configuration, the receiver member is a bracket fixed near the ends of the leg members that is configured to be attached to the main body member, which can be a wooden beam or the like. The support assemblies have a brace member that is configured to interconnect the main body member and the base member to provide further support for the main body member. The clamp assembly can engage the brace member to clamp it to the base. In yet another embodiment, one of the rack assemblies is configured only as a rack and the other rack assembly as a sawhorse.

Accordingly, the primary objective of the present invention is to provide an improved pickup truck utility rack that provides the advantages discussed above and that overcomes the disadvantages associated with presently available pickup truck utility racks.

It is also an important objective of the present invention to provide a utility rack that is easily installed on and removed from standard pickup trucks without requiring drilling into or other modifications made to the pickup truck.

It is also an important objective of the present invention to provide a utility rack that is adaptable to a wide range of pickup truck cargo area sizes.

It is also an important objective of the present invention to provide a utility rack that is easily adaptable to being mounted on pickup truck bedrails that are not parallel with the pickup truck bed.

It is also an important objective of the present invention to provide a pickup truck that is configured to carry the desired loads and resist the load and shear forces from those loads while utilizing relatively lightweight materials for the rack frame components.

It is also an important objective of the present invention to provide a pickup truck rack that can include a component which is removable and useable on the ground as a sawhorse The above and other objectives of the present invention will be explained in greater detail by reference to the attached figures and the description of the preferred embodiment which follows. As set forth herein, the present invention resides in the novel features of form, construction, mode of operation and combination of processes presently described and understood by the claims.

BRIEF DESCRIPTION OF THE DRAWINGS

In the drawings which illustrate the best modes presently contemplated for carrying out the present invention.

DETAILED DESCRIPTION OF THE PREFERRED EMBODIMENTS

With reference to the figures where like elements have been given like numerical designations to facilitate the reader's understanding of the present invention, and particularly with reference to the embodiment of the pickup truck utility rack of the present invention illustrated in the figures, the preferred embodiments of the present invention are set forth below. The enclosed figures and drawings are merely illustrative of the preferred embodiments and represent several different ways of configuring the present invention. Although specific components, materials, configurations and uses of the present invention are illustrated and set forth in this disclosure, it should be understood that a number of variations to the components and to the configuration of those components described herein and in the accompanying figures can be made without changing the scope and function of the invention set forth herein.

Figure 1:
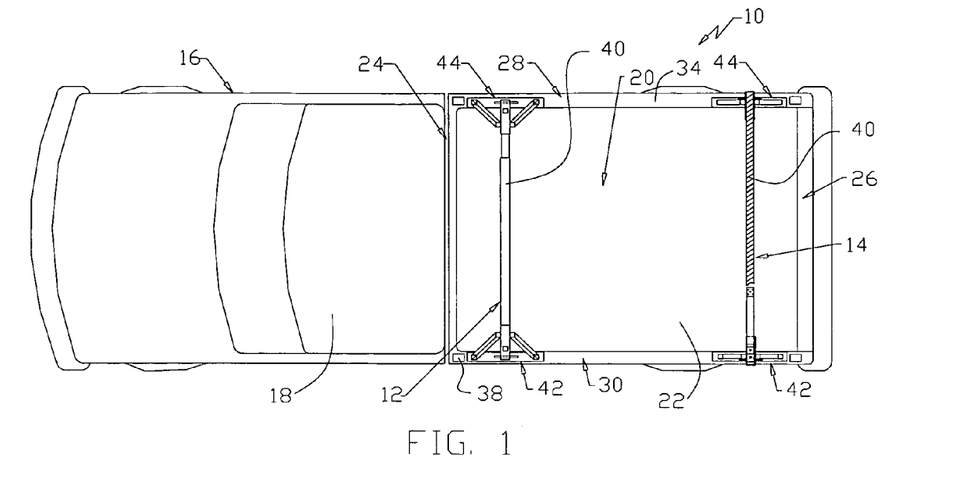
FIG. 1 is a top plan view of a pickup truck having a utility rack of the present invention mounted thereon.
Figure 2:
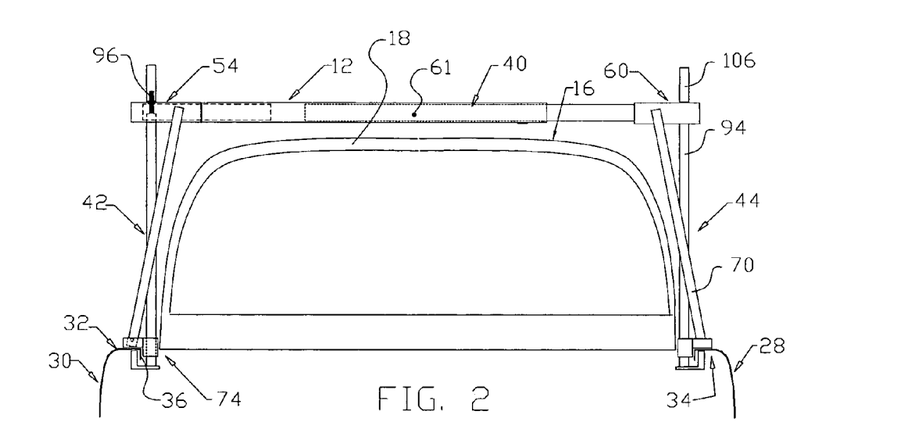
FIG. 2 is a rear section view from behind the first rack assembly shown in FIG. 1 illustrating the utility rack on a pickup truck in a plane above the cab and rear cargo area.

As best shown in FIGS. 1 and 2, the pickup truck utility rack of the present invention, identified generally as 10 and comprising generally a first rack assembly 12 and a second rack assembly 14, is for use on pickup truck 16. Pickup truck 16 has a cab portion 18 and a rear cargo area 20 located rearward of cab portion 18. The rear cargo area 20 has a generally horizontal load bearing bed 22 that is bounded on its periphery by upstanding forward wall 24, tailgate 26 and opposing sidewalls 28 and 30. As is typical for pickup trucks 16, each of sidewalls 28 and 30 has a bedrail 32 at the top thereof that comprises a generally planar upper edge 34 and an inwardly disposed lip 36. The typical bedrail 32 may have one or more stake pockets 38 located thereon. First 12 and second 14 rack assemblies are positioned on bedrail 32 in spaced apart relationship, as shown in FIG. 1, and configured to support ladders, pipe, lumber, canoes and other cargo (not shown) generally above rear cargo area 20 and cab 18, as shown in FIG. 2. As described in more detail below, first rack assembly 12 and second rack assembly 14 can be moved anywhere along bedrail 32 to change the spacing therebetween and between first rack assembly 12 and cab 18 and second rack assembly 14 and tailgate 26 (the rearward end of truck 16) where it is necessary and/or convenient for them to be located so as to support the desired cargo on truck 16.

The utility rack 10 of the present invention has two different embodiments of first rack assembly 12 and second rack assembly 14, one being suitable for use as the rack and the other for use as the rack and as a sawhorse that can be removed from pickup truck 16 and utilized on the ground or other desired surface in the known manner of using sawhorses. As shown in FIG. 1, utility rack 10 can comprise a combination of the standard rack component (i.e., first rack assembly 12) and the sawhorse rack component (i.e., second rack assembly 14) or it can comprise two of the standard rack components (first rack assembly 12) or two of the sawhorse rack components (second rack assembly 14). As explained in more detail below, a utility rack 10 with at least one sawhorse component allows the user to use utility rack 10 to carry cargo and then take the sawhorse component off of pickup truck 16 and utilize it as a sawhorse. In either configuration, the primary, larger components are configured to be collapsible for easy installation, removal and storage.

Figure 3:
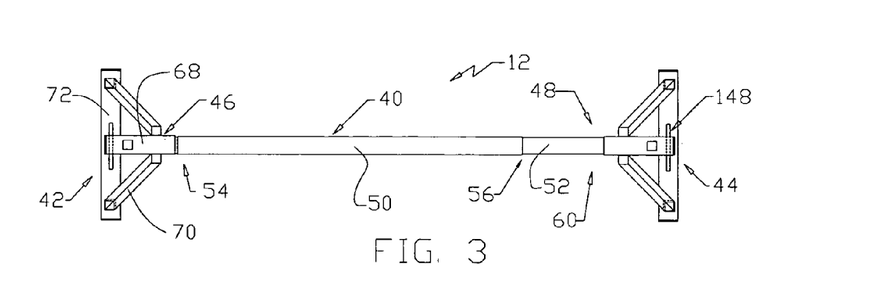
FIG. 3 is top plan view of the first rack assembly of the utility rack of the preferred invention shown in FIGS. 1 and 2.
Figure 12:
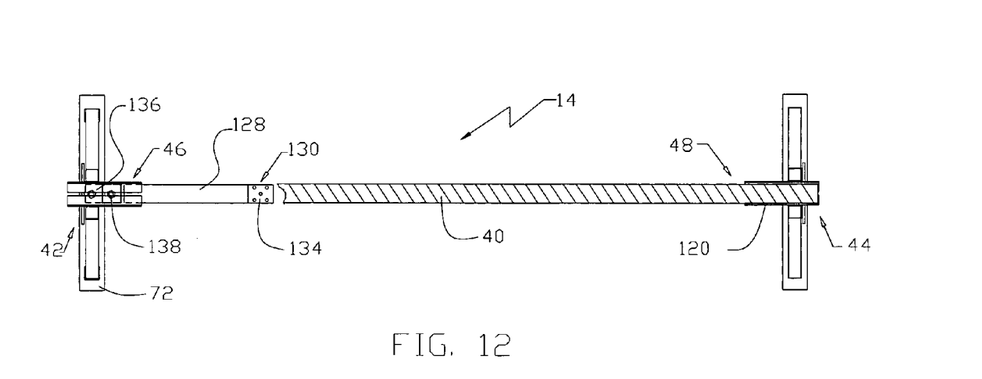
FIG. 12 is a partial cut-away top plan view of the embodiment of the present invention shown in FIG. 11.

In the preferred embodiment, best shown in FIGS. 1, 3 and 12, first rack assembly 12 and second rack assembly 14 generally comprise an elongated main body member 40, first support assembly 42 and second support assembly 44. For both rack assemblies 12 and 14, first support assembly 42 is located at first end 46 of main body member 40 and second support assembly 44 is located at the opposing second end 48 of main body member 40 to support first rack assembly 12 and second rack assembly 14 above rear cargo area 20 on pickup truck 16. In the preferred embodiments of the present invention, as shown in the figures, first support assembly 42 and second support assembly 44 are attached to main body member 40, also referred to as a spanner, and configured so as to transversely support main body member 40 in a substantially horizontal position above bed 22 of pickup truck 16. In one configuration, as shown FIGS. 1 and 2, main body member 40 transversely spans substantially the entire width of bed 22.

Various materials and component connection mechanisms can be used for the components of utility rack 10 of the present invention. For instance, main body member 40, first support assembly 42 and second support assembly 44 can be made out of metal, fiberglass, composites, certain plastics and various other materials and combinations of materials that have sufficient strength, rigidity, durability and corrosion resistance for utility rack 10 of the present invention. If desired, coated or covered materials can be used to provide the necessary corrosion resistance for use as an apparatus exposed to the outside elements. It is necessary that the material for main body member 40 be selected so as to be sufficiently strong to support the cargo desired to be transported on utility rack 10 with pickup truck 16. In the preferred embodiment, the primary components are made out of metal, such as powder coated steel, stainless steel or aluminum.

Utility rack 10 of the present invention requires the use of at least two rack assemblies (i.e., as shown in FIG. 1) to support the cargo above bed 22. As stated above, however, it is not necessary that the rack assemblies 12 and 14 be of the same configuration. In one embodiment of the utility rack 10 of present invention, shown in FIG. 1, utility rack 10 has a first rack assembly 12 configured as a rack only and a second rack assembly 14 configured for use as a sawhorse. Alternatively, both types of rack assemblies can be used for either first 12 or second 14 rack assemblies. For purposes of discussion below, without intending to limit the utility rack 10 of the present invention 10 thereby, first rack assembly 12 is a rack-only component and second rack assembly 14 is a rack/sawhorse component.

Figures 4, 5:
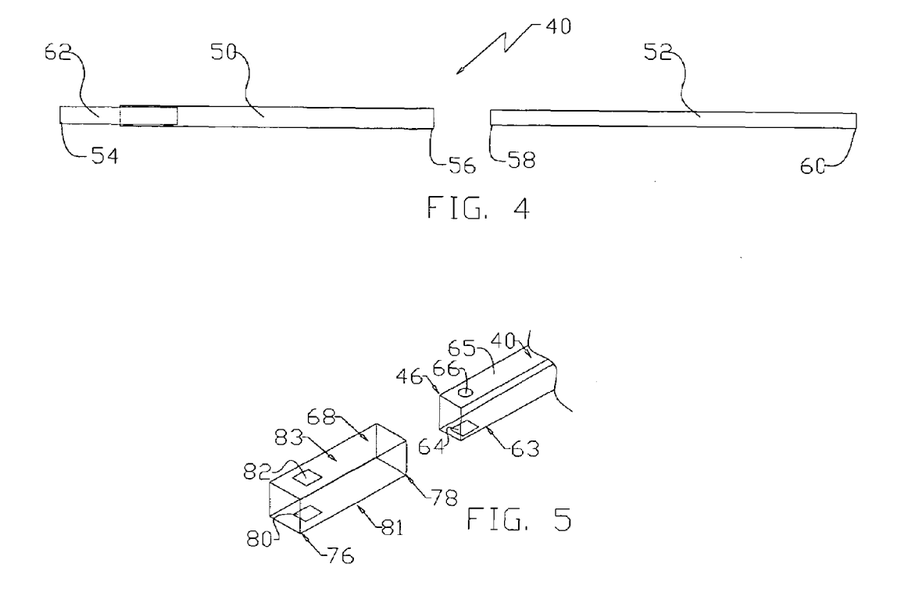
FIG. 4 is an exploded view of an embodiment of the main body member of the utility rack of the present invention.
FIG. 5 is an exploded isometric view of the first end of the main body member and a receiver member of the utility rack of the present invention.

Although first rack assembly 12 can be configured with a particular, fixed length of main body member 40 to fit a specific width bed 22, the preferred embodiment of first rack assembly 12 of the present invention has main body member 40 configured to be longitudinally adjustable in length so that a single rack assembly 12 may be utilized on a variety of different sized pickup trucks 16 having different widths of bed 22. In a preferred embodiment, best shown in FIGS. 3 and 4, main body member 40 is comprised of two or more separate tubular substructures, such as first telescoping member 50 and second telescoping member 52, that cooperate together in a telescoping manner to allow the user to lengthen or shorten the longitudinal length of main body member 40 to fit different sizes of bed 22. First telescoping member 50 has first end 54 and second end 56 and second telescoping member 52 has first end 58 and second end 60, as shown in FIG. 4. In the preferred configuration, second telescoping member 52 is a generally square tubular member that is sized and configured to have a smaller cross-section than first telescoping member 50 so that first end 58 is insertably received in second end 56 of first telescoping member 50, which is also a generally square tubular member (although other shapes can be utilized). Different lengths of main body member 40 for different sized rear cargo areas 20 can be achieved by sliding second telescoping member 52 in and out of first telescoping member 50 so as to be received in first telescoping member 50. As known in the art, a set screw 61 or other clamping member can be utilized to lock first telescoping member 50 to second telescoping member 52 so as to fix the length of main body member 40. By preventing movement of first telescoping member 50 relative to second telescoping member 52, use of set screw 61 reduces vibration of first rack assembly 12.

First end 54 of first telescoping member 50 attaches to first support assembly 42 and second end 60 of second telescoping member 52 attaches to second support assembly 44, as best shown in FIG. 3. To allow for flexibility as to which support assembly 42 or 44 is used on which side of bed 22, it is preferred that first end 54 of first telescoping member 50 have the same cross-sectional shape and size as second end 60 of second telescoping member 52. This can be achieved by providing a reduced cross-section portion 62 at first end 54 of first telescoping member 50. In the preferred embodiment, the cross-sectional shape and size of reduced cross-section portion 62 is substantially the same as second telescoping member 50. Reduced cross-section portion 62 can be a separate component that is fixedly attached to first telescoping member 50 by welding or by the use of adhesives, bolts, screws, rivets or other connectors, or by other forms of joining two members of different cross-sectional sizes that are known in the art. Alternatively, first telescoping member 50 can be a single member that has reduced cross-section portion 62 cut or otherwise manufactured from that single member. The length of reduced cross-section portion 62 must be sufficient enough in order to maintain the alignment of the first telescoping member 50 in first support assembly 42. When properly configured with the reduced cross-section portion 62 being substantially the same cross-sectional shape and size as second telescoping member 52, first end 46 and second end 48 of main body member 40 can be interchangeable between first 42 and second 44 support assemblies.

As explained in more detail below, first end 46 and second end 48 of main body member 40 are each provided with a pair of holes to facilitate the function of first support assembly 42 and second support assembly 44. In the preferred embodiment, best shown in FIG. 5, the bottom side 63 of the ends 46 and 48 of main body member 40 has a generally square bottom hole 64 and the top side 65 of the ends 46 and 48 of main body member 40 has a generally circular top hole 66. Bottom hole 64 is centered directly below top hole 66 and both holes 64 and 66 are shaped to correspond with other aspects of first support assembly 42 and second support assembly 44. In the preferred embodiment, bottom hole 64 and top hole 66 are located on the reduce cross-section portion 62 at the first end 54 of first telescoping member 50. When fully assembled, main body member 40 forms a complete transverse member that has vertically aligned holes 64 and 66 at its first 46 and second 48 ends.

Figure 7:
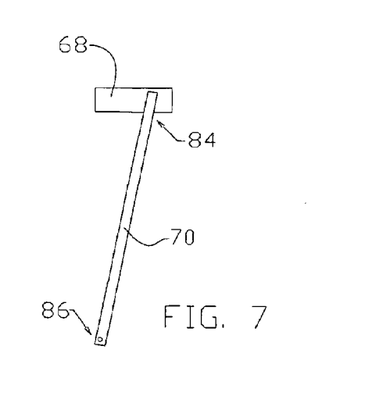
FIG. 7 is a rear view of the receiver member and leg member of the first support assembly.
Figure 8:
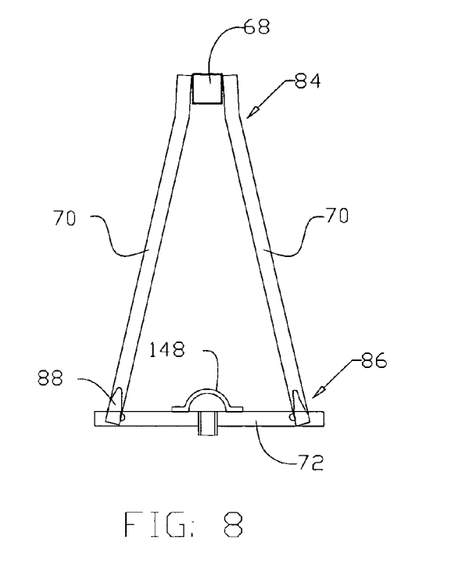
FIG. 8 is a side view of the leg members, base member and receiver member of the first support assembly of the present invention.

First support assembly 42 and second support assembly 44 cooperate together to support main body member 40 above bed 22 of pickup truck 16. In the preferred embodiment, first support assembly 42 and second support assembly 44 will be configured the same and, as a result, reference will be made only to first support assembly 42. However, all such references shall apply equally to second support assembly 44 at second end 48 of main body member 40, except that as necessary for second end 48 and right sidewall 30. In the preferred embodiment of first support assembly 42 of utility rack 10 generally comprises a receiver member 68, one or more leg members 70, base 72 and clamp assembly 74. In the preferred embodiment, receiver member 68, leg members 70 and base 72 are square tubular members. Receiver member 68 has first end 76 attached to leg members 70 and clamp assembly 74. Open second end 78 of receiver member 68 is sized and shaped to slidably receive first end 46 of main body member 40. As described below, to facilitate operation of clamping assembly 74 of the preferred embodiment, first end 76 of receiver member 68 has bottom hole 80 on its bottom side 81 and top hole 82 on its top side 83. When first end 46 of main body member 40 is inserted inside receiver member 68, holes 64 and 66 at first end 46 of main body member 40 align with holes 80 and 82 of receiver member 68 to provide a straight path through both main body member 40 and receiver member 68. As best shown in FIGS. 7 and 8, in the preferred embodiment upper end 84 of leg members 70 attach at or about the middle of receiver member 68. As known to those skilled in the art, leg member 70 can be welded, bolted, riveted or otherwise fixedly attached to receiver member 68.

Figure 9:
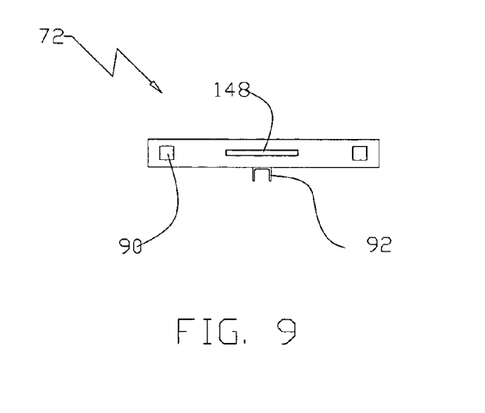
FIG. 9 is a top plan view of the base member of the first support assembly of the first rack assembly configuration.

The lower end 86 of each leg member 70 connects to base member 72. In the preferred embodiment, best shown in FIG. 8, lower ends 86 of leg members 70 have a connecting element 88 that removably connects to base member 72 to allow base member 72 to flex or pivot as necessary when upper edge 34 of bedrail 32 is not horizontal relative to bed 22 so as to maintain a generally parallel planar relationship (i.e., parallel and abutting planes) between base member 72 and upper edge 34 of bedrail 32. In the preferred embodiment, connecting element 88 is a snap button connector, which protrudes from a hole (not shown) at lower end of leg members 70, that is sized and configured to fit within opening 90, best shown in FIG. 9, at one end of base member 72. Connecting element 88 on lower end 86 of leg members 70 pass through opening 90 into base member 72 and is held in place in base member 72 by the snap buttons which protrude from leg members 70 into base member 72, which as described below mounts to bedrail 32. Although leg members 72 are prevented from disengaging from base member 72 by connecting element 88, base member 72 can pivot around the axis of the snap buttons to allow the angle of base member 72 to generally conform (i.e., planar relationship) with the angle of upper edge 34 of bedrail 32. Base member 72 is prevented from sliding off bedrail 32 toward the outside of pickup truck 16 by the channel-shaped member 92 welded at or near the center of the inside surface of base member 72. Channel member 92 contacts the inside edge of bedrail 32. The angle formed by the receiver member 68 and leg members 70 of the first support assembly 42 is useful, for while receiver member 68 receives first end 46 of main body member 40, and orients it so that it is generally horizontal to bed 22, leg members 70 are not exactly perpendicular to the bed 22. The plane formed by leg members 70 and base member 72, although generally vertical, is canted several degrees (i.e., one to fifteen degrees or more) from the vertical, leaning toward the centerline of pickup truck 16. Since there are support assemblies 42 and 44 on opposing sides of pickup truck 16, the support assemblies 42 and 44 lean toward each other and the inside open ends of each short tube of receiver member 68 face each other, thereby providing much improved support and lateral stability for first rack assembly 12 and, overall, utility rack 10.

Figure 6:
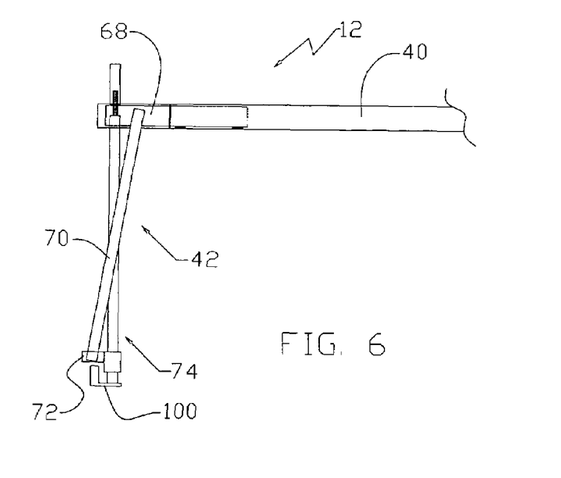
FIG. 6 is isolated rear view of the first support assembly of the utility rack of the present invention.
Figure 10:
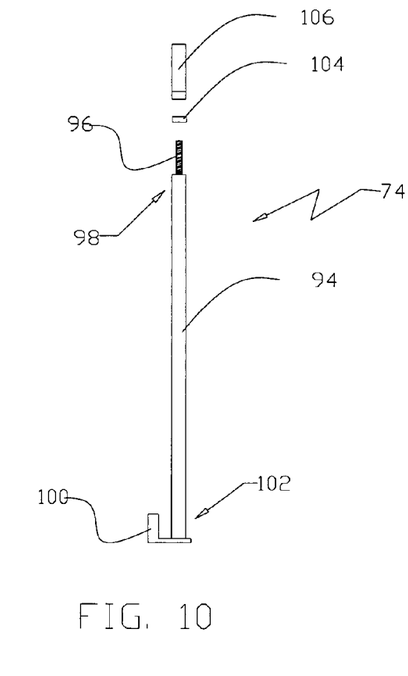
FIG. 10 is a partially exploded view of the clamp assembly of the first support assembly of the first rack assembly configuration.

Clamp assembly 74 is configured to hold first support assembly 42 and main body member 40 together and hold first support assembly 42 to bedrail 32 of pickup truck 16. In the preferred embodiment of the present invention, as best shown in FIG. 10, clamp assembly 74 comprises a generally square clamp tube 94 with a threaded shank member 96 at upper end 98 and hook member 100 at lower end 102, a spacer 104 and nut tube 106. Clamp tube 94 has a cross-sectional configuration that is slightly smaller than the square bottom 80 and top 82 holes in receiver member 68 and the square bottom hole 64 in main body member 40 and slightly larger than the round top hole 66 on main body member 40, as set forth above, such that clamp tube 94 will pass through square bottom hole 80 in receiver member 68 and square bottom hole 64 in main body member 40, but not through the round top hole 66 in main body member 40. The use of square cross-section for clamp tube 94 and square holes 64 and 80 prevents rotation of clamp tube 94, which helps prevent sliding of base member 72 and improves stability of first rack assembly 12. Threaded shank member 96 is sized and configured to pass through round top hole 66 in main body member 40 and the square top hole 82 in receiver member 68 to protrude above receiver member 68, as shown in FIGS. 2 and 6. Clamp tube 94 aligns generally perpendicular to bed 22 so as to pass through channel-shaped member 92 attached to base member 72. Hook member 100, which as shown in FIG. 10 can comprise a generally "L" shaped bracket welded to lower end 102 of clamp tube 94, is configured to go around and under lip 36 of bedrail 32. The interior walls of channel-shaped member 92 enclose lower end 102 of clamp tube 94 to prevent it from moving laterally along base member 72.

When first rack assembly 12 of utility rack 10 is mounted on bedrail 32 of pickup truck 16, a portion of hook member 100 contacts the underside of bedrail 32, which prevents clamp tube 94 from moving away from bedrail 32 toward the center of bed 22. The length of clamp tube 94 is selected such that when hook member 100 is in contact with the underside of bedrail 32, a small gap exists between the base of threaded shank 96 of clamp tube 94 and the round top hole 82 of receiver member 68. Spacer 104, which is configured like a washer or plate with a center-located hole, provides a stand-off between the lower end of nut tube 106 and top side 83 of receiver member 68. The outside diameter of spacer 104 is smaller than the dimensions of the square top hole 82 in receiver member 68, but larger than the diameter of the round top hole 66 on main body member 40. When assembled, spacer 104 rests within the perimeter of the square top hole 82 on receiver member 68 and on top side 65 of main body member 40 at the round top hole 66 with threaded shank 96 passing through spacer 104. Nut tube 106, which comprises a short tubular member with a nut welded on to or threads tapped into the bottom end of the tubular member, is configured to threadably engage threaded shank 96, as shown in FIG. 6. When assembled, nut tube 106 is tightened down onto threaded shank 96 on clamp tube 94 to compress spacer 104 against top side 65 of main body member 40 so as to draw up clamp tube 94 until hook member 100 at lower end 102 of clamp tube 94 securely contacts the underside surface of bedrail 32. Preferably, there is no contact between the lower edge of lip 36 and hook member 100 to prevent bending or otherwise damaging lip 36. In addition to providing the clamping effect of first support assembly 42, nut tube 106 of the preferred embodiment helps prevent cargo on first rack assembly 12 of utility rack 10 from sliding off the ends of main body member 40.

When installed on bedrail 32 of pickup truck 16, base member 72 of first 42 and second 44 support assemblies sits flush on top of upper edge 34 and is pivoted to reflect the possible non-horizontal configuration of the upper edge 34 of bedrail 32. First 42 and second 44 support assemblies are generally configured in a triangle-shape that resists compression and the forward and backward sheer forces to support main body member 40 in a generally horizontal position above bed 22 for carrying cargo on utility rack 10. Clamping assembly 74 ties main body member 40 and first support assembly 42 (or second support assembly 44 as the case may be) together to bedrail 32. Installation and removal of first rack assembly 12 on or off pickup truck 16 is made relatively simple by the various interconnecting components that are configured so as to not require any drilling or other modification to pickup truck 16. Because none of the various components is individually required to be very long, first rack assembly 12 can be easily stored when not in use on pickup truck 16.

In one configuration of utility rack 10 of the present invention, second rack assembly 14 is configured the same as first rack assembly 12 described above. In this manner, various cargo can be carried on utility rack 10 above rear cargo area 20. In another preferred configuration, at least second rack assembly 14 is a sawhorse component (can be both rack assemblies 12 and 14) that can be removed from pickup truck 16 and placed on the ground to be used as a conventional sawhorse. When the user has completed his or her task, the sawhorse component is easily re-installed as second rack assembly 14 to complete utility rack 16 so as to carry any desired cargo.

Figure 11:
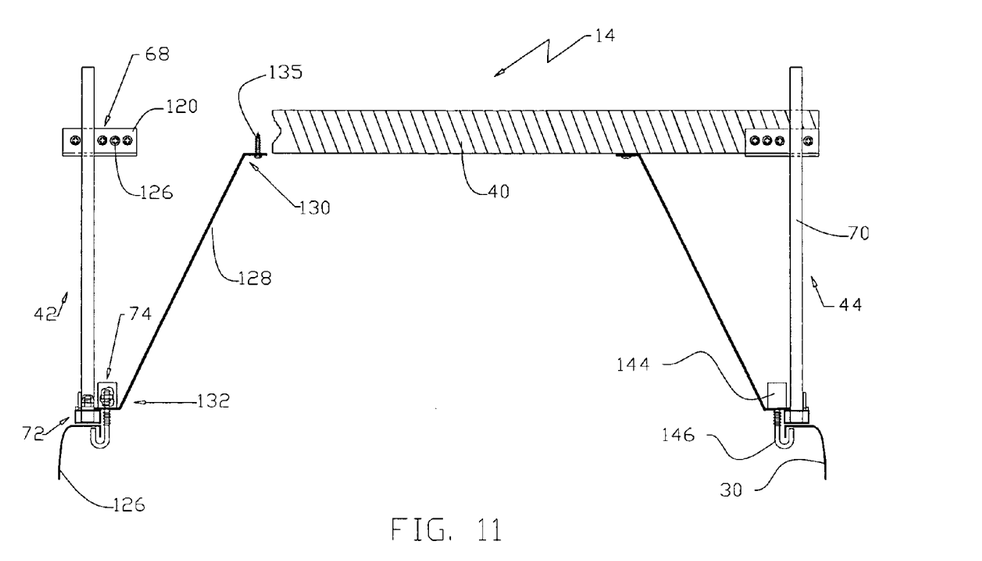
FIG. 11 is a partial cut-away rear view of the sawhorse embodiment for the second rack assembly of the present invention.
Figure 13:
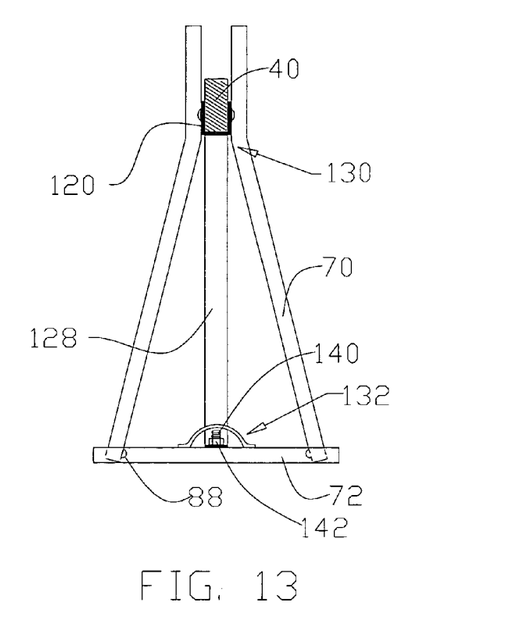
FIG. 13 is a side view of the first support assembly of the embodiment of the present invention shown in FIG. 11.
Figure 14:
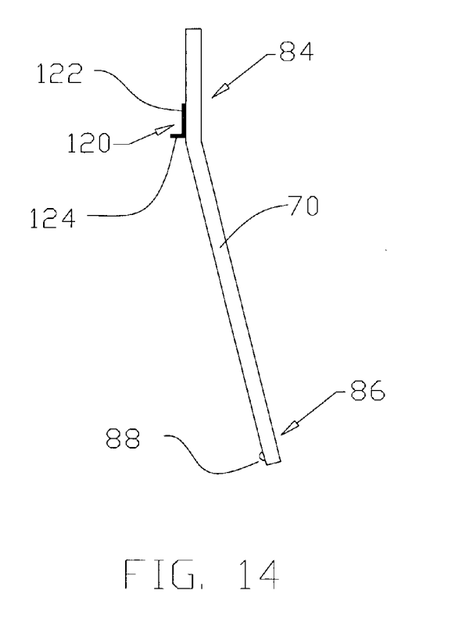
FIG. 14 is an isolated side view of a leg member and attached bracket for use with the embodiment of the present invention shown in FIG. 11.

In a preferred embodiment of the second rack assembly 14 of the utility rack 10 of the present invention, second rack assembly 14 is configured to be easily removed from pickup truck 16 and utilized as a sawhorse. In one configuration, main body member 40 is a wooden beam, such as a 2×4 or other sized wooden member, that spans between first support assembly 42 and second support assembly 44 to transverse bed 22 above rear cargo area 20. In this configuration, main body member 40 of second rack assembly 14 is cut to the appropriate length to span bed 22 and should be sized to support the desired cargo loads to be carried by utility rack 10. In an alternative configuration, main body member 40 is made of other (i.e., non-wood) materials and/or configured as described above with telescoping members 50 and 52 that can be fixedly positioned relative to each other. Many of the components for second rack assembly 14 are the same and function the same as those for first rack assembly 12, including leg members 70, base member 72 and the interaction of leg members 70 with base member 72 (i.e., the use of connecting element 88 on leg members 70 to interact with openings 90 in base member 72 to allow base member 72 to pivot so as to match up to the angle of upper edge 34 of bedrail 32). Instead of an open tubular receiver member 68, as described above for first rack assembly 12, receiver member 68 for second rack assembly 14 comprises at least one generally "L" shaped brackets 120, as shown in FIGS. 11 and 14. In the preferred embodiment, receiver member 68 is a pair of "L" shaped brackets 120 having a generally vertical portion 122 and a generally horizontal portion 124. The vertical portion 122 of brackets 120 is fixedly attached at or near the upper end 84 of leg members 70. Vertical portion 122 of brackets 120 can be welded or otherwise connected to leg members 70 and comprise one or more connecting holes 126 to connect brackets 120 to main body member 40. In the preferred embodiment, with main body member 40 of second rack assembly 14, being a wood beam, a plurality of connecting holes 126 and a like number of screws are utilized through connecting holes 126 to connect to main body member 40. When assembled, first end 46 and second end 48 of main body member 40 rest on the horizontal portion 124 of brackets 120 on opposite sides of main body member 40, as best shown in FIG. 13. If desired, a removable leg extension 127 can be attached to or at the top of leg members 70, as shown in FIGS. 11, 13 and 14, to prevent cargo from sliding off of second rack assembly 14 and removed when second rack assembly 14 is utilized off of pickup truck 16 as a sawhorse. In one configuration, leg extension 127 includes a snap-button connector that connects to the top of the tubular leg members 70. Alternatively, leg members 70 can be made as a single piece that extends above main body member 40.

Figure 15:
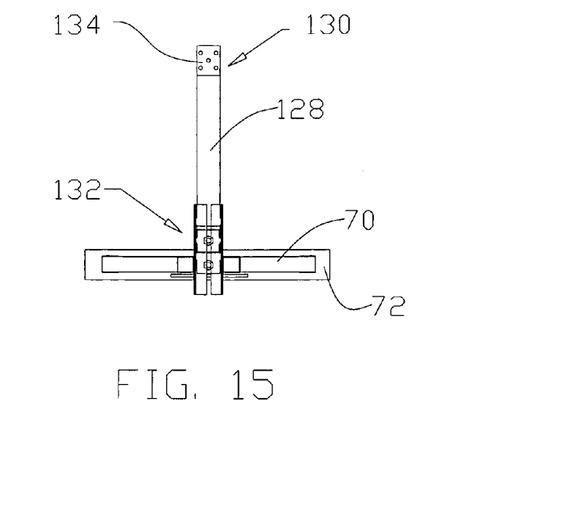
FIG. 15 is an isolated top plan view of the first support assembly and brace member of the embodiment of the present invention shown in FIG. 11.

To further support main body member 40, interconnect first 42 and second 44 support assemblies with main body member 40 and assist in holding first 42 and second 44 support assemblies to bedrail 32, the preferred embodiment of second rack assembly 14 includes brace member 128, best shown in FIGS. 11, 13 and 15. In the preferred embodiment, brace member 128 comprises a flat bar or other structural shape that has been bent at top 130 to conform with the bottom or side surfaces of main body member 40 and bent at bottom 132 to be generally horizontal to bed 22, as best shown in FIG. 11. The bent portion at top 130 has one or more holes 134, as shown in FIG. 15, to allow wood screws 135, shown in FIG. 11, to secure brace member 128 to the wooden main body member 40. As known in the art, if main body member 40 is made out of material other than wood (i.e., metal), then another type of connecting mechanism is required. From main body member 40, brace member 128 descends at an angle of approximately 20 to 40 degrees, or as necessary to provide the desired support.(i.e., 30 degrees in one embodiment), from the vertical to the horizontal bent portion at bottom 132 of brace 128. In the preferred embodiment, the horizontal portion at bottom 132 of brace 128 contains two holes, first hole 136 and second hole 138 as shown in FIG. 12, in the center along the long axis. A bolt 140, welded to the top of base member 72 with the threaded portion thereof being upwardly directed, goes up through first hole 136 and a nut 142 is screwed onto the end of bolt 140 to hold brace 128 in position. Clamp assembly 74 of second rack assembly 14 comprises a short square tube 144 welded, one open end down and the other open end facing upward, to brace member 128 such that it is centered over second hole 138. The purpose of tube 144 is to shield hook member 146, such as the J-bolt nut shown in FIG. 11, so as to prevent unauthorized tampering and to contain a very thick spacer (not shown) which helps align hook member 146 in the vertical position. The purpose of hook member 146 is to hold down first support assembly 42 or second support assembly 44 to bedrail 32 of pickup truck 16. When in position, hook member 146 makes contact with the underside of bedrail 32, with the long leg of hook member 146 passing around the outside edge of lip 36, up through second hole 138 at bottom 132 of brace member 128, through the thick spacer and into the threaded tube 142.

As a sawhorse, second rack assembly 14 can be removed from pickup truck 16 by disengaging the connection between hook member 146 and threaded tube 144 to unclamp first 42 and second 44 support assemblies from bedrail 32. Hook member 146 is removed from second rack assembly 14 or moved up into threaded tube 144 so base member 72 can rest on the ground. Because second rack assembly 14 is removed as a unit, there is no need to reconfigure it for a sawhorse or as a second rack assembly 14 when taking it off or putting it on pickup truck 16. When on pickup truck 16, second rack assembly 14, in conjunction with first rack assembly 12, supports cargo above the rear cargo area 20 and, if desired, cab 18. Second rack assembly 14 can be easily mounted or dismounted with only a few tools in a short period of time. Because base member 72 conforms to the angle of bedrail 32 and hook member 146 directly holds down brace member 128 and first 42 and second 44 support assemblies of second rack assembly 14 to bedrail 32, utility rack 10 is particularly sturdy and safe and it resists vibration and sheer forces. As stated above, the triangle shape configuration of first 42 and second 44 support assemblies provide a more secure and safe utility rack 10.

In use, the user of utility rack 10 of the present invention can decide whether to utilize first 12 and second 14 rack assemblies as sawhorse components or not. If desired, both first 12 and second 14 rack assemblies can be the rack assembly first described (non-sawhorse), both can be as second described (sawhorse) or one of each can be utilized in any position (sawhorse in forward or rearward position). First rack assembly 12 is installed on bedrail 32 of pickup truck 16 by clamping first support assembly 42 and second support assembly 44 to bedrails 32 on left 28 and right 30 sidewalls. If the first described embodiment is utilized, the first 46 and second 48 ends of main body member 40 are inserted into receiver member 58 and clamp assembly 74 is engaged by nut tube 106 to cause clamp tube 94 to draw hook member 100 upward to contact the underside of bedrail 32 and clamp first 42 and second 44 support assemblies in place on bedrail 32. If an adjustable main body member 40 is utilized, the user adjusts main body member 40 to the width of bed 22 between sidewalls 28 and 30. If the second described embodiment is utilized, hook member 146 is engaged with threaded tube 144 to clamp first 42 and second 44 support assemblies in place on bedrail 32. Both rack assembly configurations 12 and 14 allow the user to quickly and easily remove utility rack 10 from pickup truck 16. If desired, the embodiment described for second rack assembly 14 can be easily removed from pickup truck 16 and utilized as a sawhorse without the need for any modification or adjustment to second rack assembly 14. Cargo can be held in place on utility rack with ropes, cables, straps and other tie-down devices. One or more tie-down loop members 148, as best shown in FIGS. 3, 8 and 13, can be provided on base member 72 or other places on support assemblies 42 and 44 for use as a tie-down hold to assist the user in securing the cargo on utility rack 10.

While there are shown and described herein certain specific alternative forms of the invention, it will be readily apparent to those skilled in the art that the invention is not so limited, but is susceptible to various modifications and rearrangements in design and materials without departing from the spirit and scope of the invention. In particular, it should be noted that the present invention is subject to modification with regard to the dimensional relationships set forth herein and modifications in assembly, materials, size, shape and use.

What is claimed is:

1. A utility rack for a pickup truck having rear cargo area with a bed having a pair of generally opposing vertical sidewalls with bedrails at the top thereof, said bed rails having an upper edge and a lip, said utility rack comprising, a first rack assembly and a second rack assembly configured to mount to said bedrails of said opposing sidewalls on said pickup truck, each of said first rack assembly and said second rack assembly having an elongated main body member with a first end and a second end, a first support assembly at said first end of said main body member, a second support assembly at said second end of said main body member and a clamp assembly at each of said first support assembly and said second support assembly to demountably secure said first support assembly and said second support assembly to said bedrails on said opposing sidewalls, said clamp assembly interconnecting said receiver member and said main body member, said first support assembly and said second support assembly configured to support said main body member above said bed in a generally transverse relationship thereto, each of said first support assembly and said second support assembly comprising at least two leg members, a connecting element, a base member and a receiver member, said clamp assembly interconnecting said receiver member and said main body member, said leg members and said base member forming a generally triangular configuration with said receiver member disposed between an upper end of said leg members, said receiver member configured to connect to either said first end or said second end of said main body member, a lower end of each of said leg members pivotally connected to said base member so that said base member is in a generally parallel planar relationship with said upper edge of said bedrail when said utility rack is mounted on said pickup truck.

2. The utility rack according to claim 1, wherein each of said first rack assembly and said second rack assembly are generally collapsible.

3. The utility rack according to claim 1, wherein said main body member is longitudinally adjustable in length.

4. The utility rack according to claim 1, wherein said clamp assembly has a hook member configured to cooperate with said bedrail to demountably secure said first rack assembly or said second rack assembly to said pickup truck.

5. The utility rack according to claim 1, wherein said leg members of said first support assembly and said second support assembly of at least one of said first rack assembly and said second rack assembly are each inwardly inclining relative to said sidewalls, said first support assembly and said second support assembly generally angled toward each other above said bed of said truck.

6. The utility rack according to claim 1, wherein said clamp assembly further comprises a clamp tube having a threaded shank at a first end thereof, a nut tube sized and configured to be threadably engaged with said threaded shank, a channel member attached to and extending below said base member and a hook member attached to a second end of said clamp tube, said channel member configured to at least partially confine said second end of said clamp tube and prevent outward sliding of said base member, said clamp tube configured to draw said hook member against said bedrail when said nut tube engages said main body member or said receiver member.

7. The utility rack according to claim 1, wherein said at least one of said first rack assembly and said second rack assembly is configured for use as a sawhorse.

8. The utility rack according to claim 1, wherein said main body member is comprised of at least a first telescoping member and a second telescoping member, said first telescoping member and said second telescoping member in telescoping relationship.

9. The utility rack according to claim 8, wherein said main body member further comprises means for fixing the position of said first telescoping member relative to said second telescoping member.

10. The utility rack according to claim 1, wherein said base member is tubular and said connecting element is disposed through an opening in said base member and configured to cooperate with said base member to secure said leg members to said base member and allow rotation of said base member relative to said leg members so as to place said base member in a generally abutting relationship with said upper edge of said bedrail.

11. The utility rack according to claim 10, wherein said connecting element is a snap-button connector.

12. The utility rack according to claim 1, wherein said receiver member of at least one of said first rack assembly and said second rack assembly comprises a bracket attached to each of said leg members, said bracket having one or more holes for connecting said bracket to said main body member.

13. The utility rack according to claim 12, wherein said main body member is fixedly connected to said receiver member.

14. The utility rack according to claim 1, wherein said receiver member of at least one of said first rack assembly and said second rack assembly is a tubular member configured to receive therein said first end or said second end of said main body member.

15. The utility rack according to claim 14, wherein said first end and said second end of said main body member each has a top hole and a bottom hole and said receiver member on each of said first support assembly and said second support assembly has a top hole and a bottom hole, said top hole and said bottom hole of said main body member configured to be in cooperating relationship with said top hole and said bottom hole of said receiver member.

16. The utility rack according to claim 15, wherein said clamp assembly further comprises a clamp tube having a threaded shank at a first end thereof, a nut tube sized and configured to be threadably engaged with said threaded shank and a hook member attached to a second end of said clamp tube, said threaded shank configured to pass through said top hole and said bottom hole of said main body member and said top hole and said bottom hole of said receiver member to be threadably received in said nut tube, said clamp tube configured to compress said main body member within said receiver member and draw said hook member against said bedrail when said nut tube fully engages said threaded shank.

17. The utility rack according to claim 16, wherein said first end of said clamp tube is sized and configured to be received through said bottom hole of said receiver and said bottom hole of said main body member and prevent rotation of said clamp tube, said first end of said clamp tube in spaced relation to said top hole of said main body member.

18. The utility rack according to claim 17 further comprising a channel member attached to and extending below said base member, said channel member configured to at least partially confine said second end of said clamp tube and prevent outward sliding of said base member.

19. The utility rack according to claim 1, wherein each of said first support assembly and said second support assembly of said first rack assembly and/or said second rack assembly further comprises a brace member configured to interconnect said main body member and said base member.

20. The utility rack according to claim 19, wherein said clamp assembly engages said brace member to clamp said brace member to said base member.

21. The utility rack according to claim 19, wherein said clamp assembly further comprises a threaded tube on said brace member for threadably receiving a hook member therein.

22. A utility rack for a pickup truck having rear cargo area with a bed having a pair of generally opposing vertical sidewalls with bedrails at the top thereof, said bed rails having an upper edge and a lip, said utility rack comprising, a first rack assembly and a second rack assembly configured to mount to said bedrails of said opposing sidewalls on said pickup truck, each of said first rack assembly and said second rack assembly having an elongated main body member with a first end and a second end, a first support assembly at said first end of said main body member, a second support assembly at said second end of said main body member and a clamp assembly at each of said first support assembly and said second support assembly to demountably secure said first support assembly and said second support assembly to said bedrails on said opposing sidewalls, said first support assembly and said second support assembly configured to support said main body member above said bed in a generally transverse relationship thereto, each of said first support assembly and said second support assembly comprising at least two leg members, a connecting element, a tubular base member and a receiver member, said leg members and said base member forming a generally triangular configuration with said receiver member disposed between an upper end of said leg members, said receiver member configured to connect to either said first end or said second end of said main body member, a lower end of each of said leg members pivotally connected to said base member so that said base member is in a generally parallel planar relationship with said upper edge of said bedrail when said utility rack is mounted on said pickup truck, said connecting element disposed through an opening in said base member and configured to cooperate with said base member to secure said leg members to said base member and allow rotation of said base member relative to said leg members so as to place said base member in a generally abutting relationship with said upper edge of said bedrail.

23. The utility rack according to claim 22, wherein said clamp assembly further comprises a clamp tube and a hook member, said clamp tube having a threaded shank at a first end thereof and a nut tube sized and configured to be threadably engaged with said threaded shank, said hook member configured to cooperate with said bedrail so as to demountably secure said first rack assembly or said second rack assembly to said pickup truck, said hook member attached to a second end of said clamp tube, said channel member configured to at least partially confine said second end of said clamp tube and prevent outward sliding of said base member, said clamp tube configured to draw said hook member against said bedrail when said nut tube engages said main body member or said receiver member.

24. The utility rack according to claim 22, wherein said clamp assembly interconnects said receiver member and said main body member.

25. The utility rack according to claim 22, wherein said at least one of said first rack assembly and said second rack assembly is configured for use as a sawhorse.

26. The utility rack according to claim 22, wherein said receiver member of at least one of said first rack assembly and said second rack assembly comprises a bracket attached to each of said leg members, said bracket having one or more holes for connecting said bracket to said main body member.

27. The utility rack according to claim 22, wherein said main body member is comprised of at least a first telescoping member and a second telescoping member, said first telescoping member and said second telescoping member in telescoping relationship.

28. The utility rack according to claim 27, wherein said main body member further comprises means for fixing the position of said first telescoping member relative to said second telescoping member.

29. The utility rack according to claim 22, wherein each of said first support assembly and said second support assembly of said first rack assembly and/or said second rack assembly further comprises a brace member configured to interconnect said main body member and said base member.

30. The utility rack according to claim 29, wherein said clamp assembly further comprises a threaded tube on said brace member for threadably receiving a hook member therein, said hook member configured to cooperate with said bedrail so as to demountably secure said first rack assembly or said second rack assembly to said pickup truck.

31. The utility rack according to claim 22, wherein said receiver member of at least one of said first rack assembly and said second rack assembly is a tubular member configured to receive therein said first end or said second end of said main body member.

32. The utility rack according to claim 31, wherein said first end and said second end of said main body member each has a top hole and a bottom hole and said receiver member on each of said first support assembly and said second support assembly has a top hole and a bottom hole, said top hole and said bottom hole of said main body member configured to be in cooperating relationship with said top hole and said bottom hole of said receiver member.

33. The utility rack according to claim 32, wherein said clamp assembly further comprises a clamp tube and a hook member, said clamp tube having a threaded shank at a first end thereof and a nut tube sized and configured to be threadably engaged with said threaded shank, said hook member configured to cooperate with said bedrail so as to demountably secure said first rack assembly or said second rack assembly to said pickup truck, said hook member attached to a second end of said clamp tube, said threaded shank configured to pass through said top hole and said bottom hole of said main body member and said top hole and said bottom hole of said receiver member to be threadably received in said nut tube, said clamp tube configured to compress said main body member within said receiver member and draw said hook member against said bedrail when said nut tube fully engages said threaded shank.

34. The utility rack according to claim 33, wherein said first end of said clamp tube is sized and configured to be received through said bottom hole of said receiver and said bottom hole of said main body member and to prevent rotation of said clamp tube, said first end of said clamp tube in spaced relation to said top hole of said main body member.

35. The utility rack according to claim 34 further comprising a channel member attached to and extending below said base member, said channel member configured to at least partially confine said second end of said clamp tube and prevent outward sliding of said base member.

36. A utility rack for a pickup truck having rear cargo area with a bed having a pair of generally opposing vertical sidewalls with bedrails at the top thereof, said bed rails having an upper edge and a lip, said utility rack comprising:

a first rack assembly configured to mount to said bedrails of said opposing sidewalls on said pickup truck, said first rack assembly having an elongated main body member with a first end and a second end, a first support assembly at said first end of said main body member, a second support assembly at said second end of said main body member and a clamp assembly at each of said first support assembly and said second support assembly to demountably secure said first support assembly to said bedrails, said first support assembly and said second support assembly configured to support said main body member above said bed in a generally transverse relationship thereto, each of said first support assembly and said second support assembly comprising at least two leg members, a connecting element, a base member and a tubular receiver member, said leg members and said base member forming a generally triangular configuration with said receiver member disposed between an upper end of said leg members, said receiver member configured to receive either said first end or said second end of said main body member, a lower end of each of said leg members pivotally connected to said base member so that said base member is in a generally parallel planar relationship with said upper edge of said bedrail when said utility rack is mounted on said pickup truck, said clamp assembly having a clamp tube with a threaded shank at a first end thereof, a nut tube sized and configured to be threadably engaged with said threaded shank, a channel member attached to and extending below said base member and a hook member attached to a second end of said clamp tube, said channel member configured to at least partially confine said second end of said clamp tube, said clamp tube configured to compress said main body member within said receiver member and draw said hook member against said bedrail when said nut tube engages said main body member or said receiver member; and a second rack assembly configured to mount to said bedrails of said opposing sidewalls on said pickup truck, said second rack assembly configured for use as a sawhorse, said second rack assembly having an elongated main body member with a first end and a second end, a first support assembly at said first end of said main body member, a second support assembly at said second end of said main body member and a clamp assembly at each of said first support assembly and said second support assembly to demountably secure said second support assembly to said bedrails, said first support assembly and said second support assembly configured to support said main body member above said bed in a generally transverse relationship thereto, each of said first support assembly and said second support assembly comprising at least two leg members, a connecting element and a base member, said leg members and said base member forming a generally triangular configuration with a receiver member disposed between an upper end of said leg members, said receiver member having a bracket attached to each of said leg members, said bracket having one or more holes for connecting said bracket to either said first end or said second end of said main body member, a lower end of each of said leg members pivotally connected to said base member so that said base member is in a generally parallel planar relationship with said upper edge of said bedrail when said utility rack is mounted on said pickup truck.

37. The utility rack according to claim 36, wherein said base member is tubular and said connecting element is disposed through an opening in said base member and configured to cooperate with said base member to secure said leg members to said base member and allow rotation of said base member relative to said leg members so as to place said base member in a generally abutting relationship with said upper edge of said bedrail.

38. The utility rack according to claim 36, wherein said main body member of said first rack assembly is comprised of at least a first telescoping member and a second telescoping member, said first telescoping member and said second telescoping member in telescoping relationship.

39. The utility rack according to claim 36, wherein said leg members of said first support assembly and said second support assembly of said first rack assembly are each inwardly inclining relative to said sidewalls, said first support assembly and said second support assembly generally angled toward each other above said bed of said truck.

40. The utility rack according to claim 36, wherein said clamp assembly interconnects said receiver member and said main body member.

41. The utility rack according to claim 36 wherein each of said first support assembly and said second support assembly of said second rack assembly further comprises a brace member configured to interconnect said main body member and said base member, said clamp assembly of said second rack assembly configured to clamp said brace member to said base member.

42. The utility rack according to claim 36, wherein said first rack assembly further comprises a top hole and a bottom hole at said first end and said second end of said main body member and a top hole and a bottom hole in said receiver member, said top hole and said bottom hole of said main body member configured to be in cooperating relationship with said top hole and said bottom hole of said receiver member.

43. The utility rack according to claim 42, wherein said threaded shank is configured to pass through said top hole and said bottom hole of said main body member and said top hole and said bottom hole of said receiver member.

44. The utility rack according to claim 43, wherein said first end of said clamp tube is sized and configured to be received through said bottom hole of said receiver and said bottom hole of said main body member and to prevent rotation of said clamp tube, said first end of said clamp tube in spaced relation to said top hole of said main body member.

45. A utility rack for a pickup truck having rear cargo area with a bed having a pair of generally opposing vertical sidewalls with bedrails at the top thereof, said bed rails having an upper edge and a lip, said utility rack comprising:

a rack assembly configured to mount to said bedrails of said opposing sidewalls on said pickup truck, said rack assembly configured for use as a sawhorse, said rack assembly having an elongated main body member with a first end and a second end, a first support assembly at said first end of said main body member, a second support assembly at said second end of said main body member and a clamp assembly at each of said first support assembly and said second support assembly to demountably secure said second support assembly to said bedrails, said first support assembly and said second support assembly configured to support said main body member above said bed in a generally transverse relationship thereto, each of said first support assembly and said second support assembly comprising at least two leg members, a connecting element and a base member, said leg members and said base member forming a generally triangular configuration with a receiver member disposed between an upper end of said leg members, said receiver member having a bracket attached to each of said leg members, said bracket having one or more holes for connecting said bracket to either said first end or said second end of said main body member, a lower end of each of said leg members pivotally connected to said base member so that said base member is in a generally parallel planar relationship with said upper edge of said bedrail when said utility rack is mounted on said pickup truck.

46. The utility rack according to claim 45, wherein said base member is tubular and said connecting element is disposed through an opening in said base member and configured to cooperate with said base member to secure said leg members to said base member and allow rotation of said base member relative to said leg members so as to place said base member in a generally abutting relationship with said upper edge of said bedrail.

* * * * *